United States Patent

Eto et al.

[15] 3,647,947

[45] Mar. 7, 1972

[54] CHROMINANCE SIGNAL GENERATOR HAVING A PATTERNED FILTER

[72] Inventors: Yoshizumi Eto, Hachioji; Masao Hibi, Kodaira, all of Japan

[73] Assignee: Hitachi, Ltd., Tokyo, Japan

[22] Filed: Apr. 3, 1970

[21] Appl. No.: 25,315

[30] Foreign Application Priority Data

Apr. 11, 1969 Japan....................................44/27655
Apr. 11, 1969 Japan....................................44/27656

[52] U.S. Cl.....................................178/5.4 ST
[51] Int. Cl.....................................H04n 9/06
[58] Field of Search....................................178/5.4, 5.4 ST

[56] References Cited

UNITED STATES PATENTS

| | | | |
|---|---|---|---|
| 3,378,633 | 4/1968 | Macovski | 178/5.4 ST |
| 3,419,672 | 12/1968 | Macovski | 178/5.4 ST |
| 3,531,584 | 9/1970 | Bell | 178/5.4 ST |

*Primary Examiner*—Richard Murray
*Attorney*—Craig, Antonelli and Hill

[57] ABSTRACT

A chrominance signal generator used for a color television system, color facsimile system or the like, said signal generator including a striped or latticed special color filter placed in front of an image pickup tube to generate a composite chrominance signal and a signal processing system for separating three component primary color signals from the said composite signal, the said signal processing system being designed on the basis of the hypothesis of the close correlation between consecutive horizontal scanning lines of an image.

11 Claims, 9 Drawing Figures

INVENTORS

YOSHIZUMI ETO and MASAO HIBI

BY Craig, Antonelli, Stewart & Hill

ATTORNEYS

INVENTORS

YOSHIZUMI ETO and MASAO HIBI

BY Craig, Antonelli, Stewart & Hill

ATTORNEYS

Patented March 7 1972 3,647,947

4 Sheets-Sheet 3

INVENTORS

YOSHIZUMI ETO and MASAO HIBI

BY Craig, Antonelli, Stewart & Hill

ATTORNEYS

INVENTORS

YOSHIZUMI ETO and MASAO HIAI

BY Craig, Antonelli, Stewart & Hill

ATTORNEYS

CHROMINANCE SIGNAL GENERATOR HAVING A PATTERNED FILTER

This invention relates to a chrominance signal generator, particularly to such a signal generator wherein a striped or latticed color filter is utilized to generate a composite chrominance signal from which component chrominance signals are separated through a process designed on the basis of the hypothesis of the close correlation between consecutive horizontal scanning lines or between horizontally adjacent points of an image.

A typical known device for generating a composite chrominance signal with a single image pickup tube is a chrominance signal generator such as hereinafter described. With such a signal generator, however, only a signal covering a narrow portion of the response range of an image pickup tube can be obtained and, therefore, a satisfactory resolution is not attained. Thus, in order to obtain a video signal of a tolerable resolution, it is to pick up the luminance signal with a separate image pickup tube.

An object of this invention is to provide a chrominance signal generator which can produce chrominance signals of a wide frequency band and, therefore, provide high resolution.

Another object of this invention is to provide a black- and-white film containing a black- and-white image of an object and chrominance information thereof in a horizontal resolution nearly corresponding to the response frequency ranges of the black- and-white film and the image pickup tube.

In order to achieve the above objects, the chrominance signal generator of this invention comprises a filter having a color pattern of stripes or a lattice placed in front of a plane on which an image of an object is projected, said pattern being arranged in a manner such that when an image projected on said image pickup means through said filter is scanned by a scanning means, a composite chrominance signal is obtained, said composite signal comprising three component signals representing three special color components respectively corresponding to the green component (hereinafter, red, blue and green are abbreviated respectively as R, B and G), either one of (R+G) or (B+G) component, and (R+B+G) component of said image, said three component signals occurring in an identical repetition period but in different phases to each other; means for obtaining said composite chrominance signal by scanning said image projected thereto; a delay circuit for delaying said composite chrominance signal by a predetermined time; and operation circuit the inputs of which are said composite chrominance signal and the output of said delay circuit; means for extracting an index signal from the output of said operation circuit to thereby obtain a gating signal; means for obtaining the R component and B component from said output of said operation circuit on the basis of said gating signal; and means for obtaining the G component from said R and B components and said composite chrominance signal.

The features and merits of this invention will be clarified by the following description given with reference to the accompanying drawings, in which.

Figure 1:
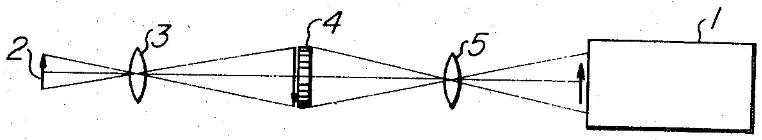
FIG. 1 PRIOR ART
FIG. 1 is a schematic diagram showing the optical system of the conventional chrominance signal generator.
Figure 2:
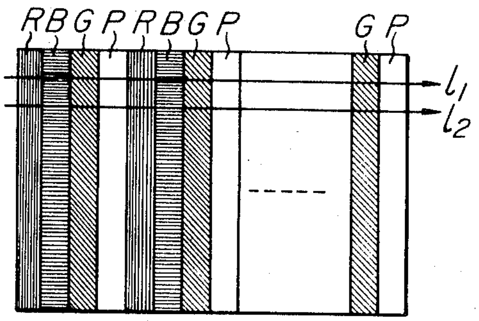
FIG. 2 PRIOR ART
FIG. 2 is a diagram illustrating the conventional stripe filter.
Figure 3:
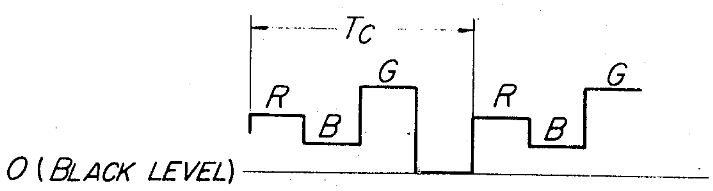
FIG. 3 shows the waveform of a signal related to the operation of the conventional chrominance signal generator.

Referring to FIG. 1 which shows an example of the conventional chrominance signal generator, reference numeral 1 designates an image pickup tube, 2 an object, 3 an objective lens, 4 a striped filter, and 5 a relay lens. An image of the object 2 is focused on the image face of the image pickup tube 1 through the striped filter 4 by means of the lenses 3, 5. The striped filter 4 is an optical filter of a special structure in which narrow filter elements of R, B, G and P (black) are juxtaposed in a fixed sequential order as shown in FIG. 2. If an image focused on the image pickup tube 1 through such a stripe filter 4 is scanned by an electron beam in the direction perpendicular to the stripes (as shown by arrows $l_1$, $l_2$ in FIG. 2), an output signal having a waveform such as shown in FIG. 3 is obtained from the image pickup tube 1. Assuming that the scanning electron beam takes a certain time $T_c$ to scan the length covering a complete set of four elementary stripes (for instance, the distance from the starting edge of a red stripe to the corresponding edge of the next red stripe), the output signal of the image pickup tube corresponds to a time-division multiplex signal which includes R, B and G signals respectively sampled in frequency $1/T_c$ (which is also the carrier frequency $f_c$).

In order to demodulate the above time-division multiplex signal, that is, to separate the respective R, B and G signals from the composite signal, the black pulses attributed to the black filter elements P are first extracted, and phasic positions of the respective color signals are determined on the basis of the said black pulse. Then, the respective color signals are obtained by sampling the composite signal at the thus determined phasic positions, followed by being let pass low-pass filters.

In order to minimize crosstalk among the modulated R, B and G signals at the output of the image pickup tube, it is necessary for the image pickup tube to be able to reproduce signals of a frequency several times as high as the above-mentioned frequency $f_c$. However, it is proved by the sampling theorem that only a signal occupying a frequency range of one-half of $f_c$ or less can be demodulated in high fidelity by such a sampling method as described above. Thus, according to the conventional system, the effective frequency band of the generated composite signal is considerably narrow in comparison with the response range of the image pickup tube, and the resolution of the resultant picture is accordingly poor.

The fundamental principle of this invention is to produce a composite chrominance signal in which signal zones for a G color component are extended into zones allotted to R and B components, making combined chrominance signal zones, and afterwards to separate the respective component signals on the basis of the close vertical correlation in video signals, that is, close resemblance of signals between adjacent horizontal scanning lines. In this manner, substantially the entire response range of an image pickup tube is made available for G component which is the nearest to the luminance signal, a high horizontal resolution being thereby obtained.

Figure 4:
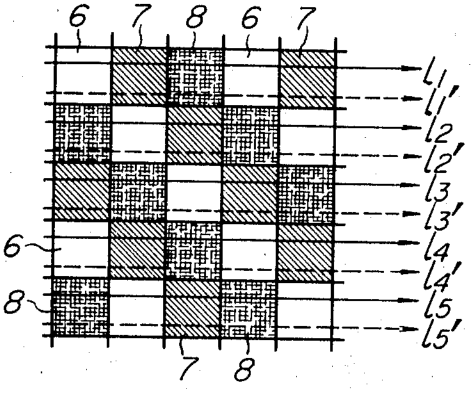
FIGS. 4 and 5 are portions of the color pattern of the filters used in this invention.

FIG. 4 shows schematically a portion of an embodiment of the special filter element used in the system of this invention. The filter includes transparent (R+G+B) sections 6, green (G) sections 7 and yellow (R+G) sections 8 arranged in a fixed order. The sections 8 may alternatively be cyan (B+G), though it is assumed to be yellow (R+G) in this embodiment. If an image of an object is projected on the image face of an image pickup tube through such a filter as mentioned above, the image will be devoid of R+B components in areas corresponding to sections 7 (G sections) of the filter and a B component in areas corresponding to section 8 (R+G sections). Therefore, when such an image is vertically scanned by an electron beam as indicated by arrows $l_1$, $l_2$ . . . . ., a composite chrominance signal as shown with index $S_{(t)}$ in FIG. 7 will be obtained. Character T indicates the period of a complete cycle of the signal. It will be noted that in the preceding horizontal scan the signal was in a phasic position leading the signal from the present scanning by T/3, as shown with index $S_{(t-h)}$ in FIG. 7. In FIG. 4, arrows $l'_1$, $l'_2$ ..... indicate lines of the scanning in the next field.

The filter used for generating such a composite signal as described above is not limited to the one shown in FIG. 4. For example, a filter having three kinds of strips, that is, transparent (9), green (10) and yellow (11) strips juxtaposed in a fixed order is positioned in front of an image pickup tube with the direction of the stripes inclined at a predetermined angle $\theta$ in relation to the direction of the electronic scanning. With such an arrangement, a composite chrominance signal identical to that obtained by the filter shown in FIG. 4 can be generated. Assuming that the width of each stripe is $d_1$ and the distance between scanning lines is $d_2$, the angle $\theta$ should be determined by the following formula, $$\cos \theta = d_1/d_2 \quad (1)$$

Next, the system for separating three primary colors (R, G and B) from the composite signal obtained through the above-described measures will be explained.

Figure 7:
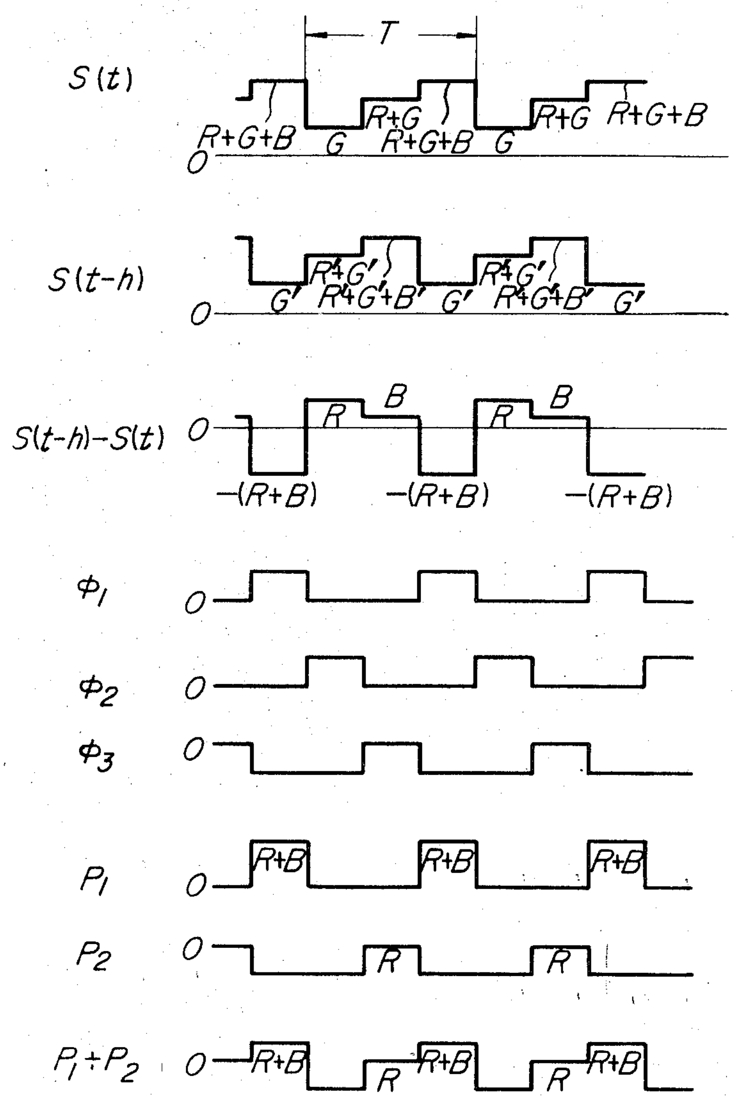
FIG. 7 shows waveforms of signals at various points in the diagram shown in FIG. 6.
Figure 6:
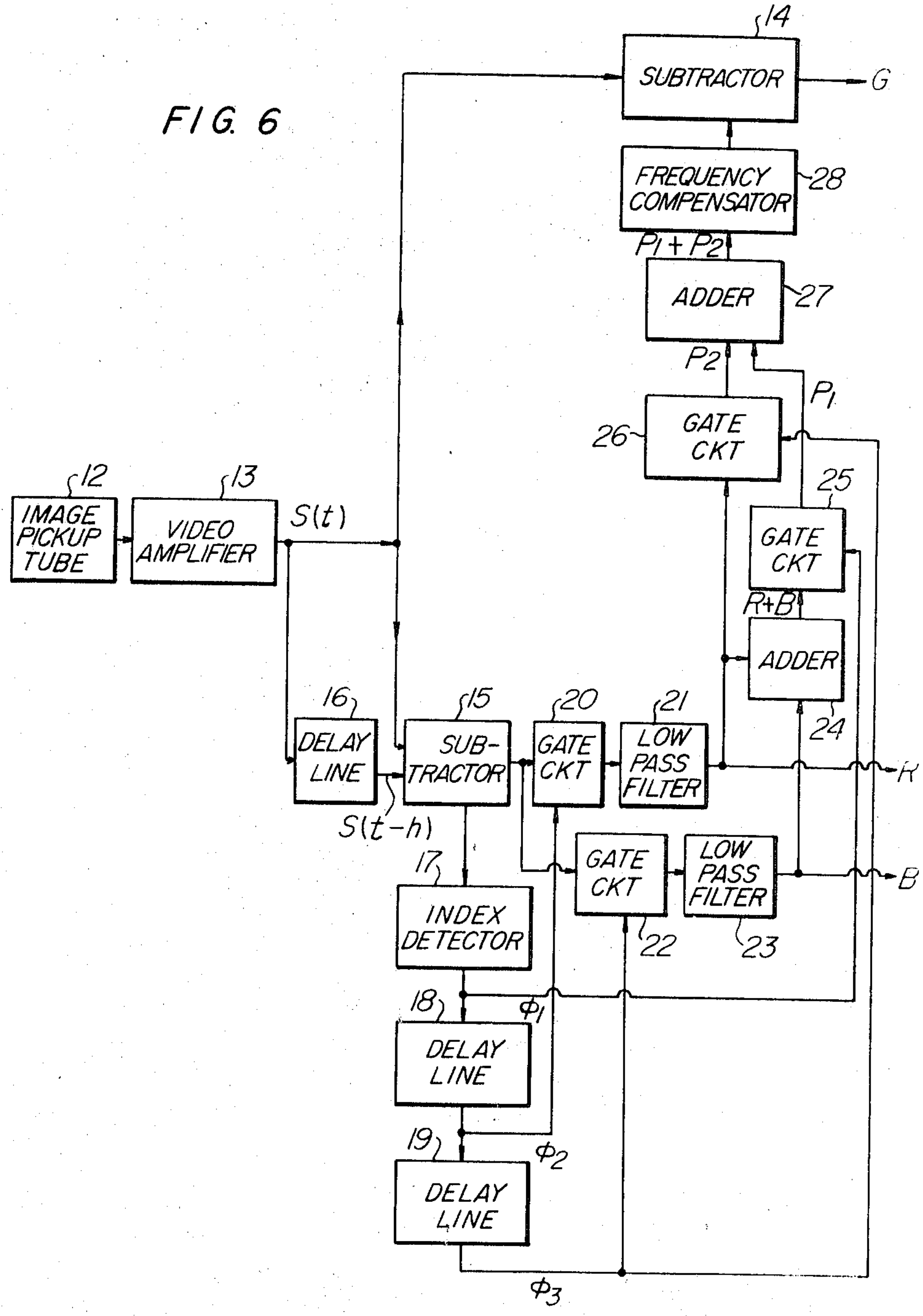
FIG. 6 is a block diagram of an embodiment of the chrominance signal generator of this invention.

Referring to FIGS. 6 and 7, the composite chrominance sign $S_{(t)}$ produced from an image pickup tube 12 is amplified by a video amplifier 13 and the amplified signal $S_{(t)}$ is then applied subtractors 14 and 15. The output of the amplifier 13 is also applied to the subtractor 15 through a delay line 16 which delays the signal by one horizontal scanning period. In FIG. 7 the delayed signal from the preceding scanning is indicated by $S_{(t-h)}$. Generally, as signals in two consecutive horizontal scannings are closely correlated to each other, the color components R, G and B in the signal $S_{(t)}$ can be deemed nearly equal to the respective color components R′, G′ and B′ in the preceding and delayed signal $S_{(t-h)}$. Therefore, the output signal of the subtractor 15 can be represented as such as indicated by $S_{(t-h)} - S_{(t)}$ in FIG. 7. Negative portions of this output signal $S_{(t-h)} - S_{(t)}$ are extracted by an index detector 17 and are made gating pulses $0_1$ after the waveform is shaped. A second sequence of gating pulses $0_2$ is obtained by delaying the first gating pulses $0_1$ by T/3 through a delay line 18. Similarly, a third sequence of gating pulses $0_3$ is produced by delaying the second gating pulses $0_2$ by T/3 through another delay line 19. Accordingly, an R signal is obtained by sampling the output $S_{(t-h)} - S_{(t)}$ of the subtractor 15 with the second gating pulses $0_2$ in a gate circuit 20 and letting the sampled signal pass through a low-pass filter 21. Similarly, a B signal is obtained by sampling the same output $S_{(t-h)} - S_{(t)}$ using the third gating pulses $0_3$ in a gate circuit 22, the sampled signal being passed through another low-pass filter 23. Further, the thus obtained R and B signals are added in an adder 24, and the output of this adder is sampled by the gating pulses $0_1$ in a gate circuit 25 to thereby obtain a signal $P_1$ whose envelope corresponds to R+B and whose cyclic period is T. On the other hand, another signal $P_2$ having an envelope corresponding to a R signal and the same period T is produced by sampling the R signal by the gating pulses $0_3$ in a gate circuit 26. Signal $P_1+P_2$, obtained by adding the outputs of the gate circuits 25 and 26 in an adder 27, is applied to the previously mentioned subtractor 14 through a frequency compensator 28. This frequency compensator 28 trims the signal $P_1+P_2$ so as to fit to the limited response range of the image pickup tube. The output $P_1+P_2$ of the frequency compensator 28 is subtracted from the output $S_{(t)}$ of the video amplifier 13 in the subtractor 14 to produce the G signal.

It will be understood that the composite signal from the preceding horizontal scanning may be lagging, instead of leading, in the phasic position by a period T/3 in relation to the signal from the present scanning as a result of different pattern arrangement in the filter element. For such a case, it is only required necessary to exchange signals $S_{(t)}$ and $S_{(t-h)}$ to reach the same results.

As described above, the three primary chrominance signals are separated and then transmitted to receivers in the form of the NTSC composite signal, for example.

Figures 5, 8A:
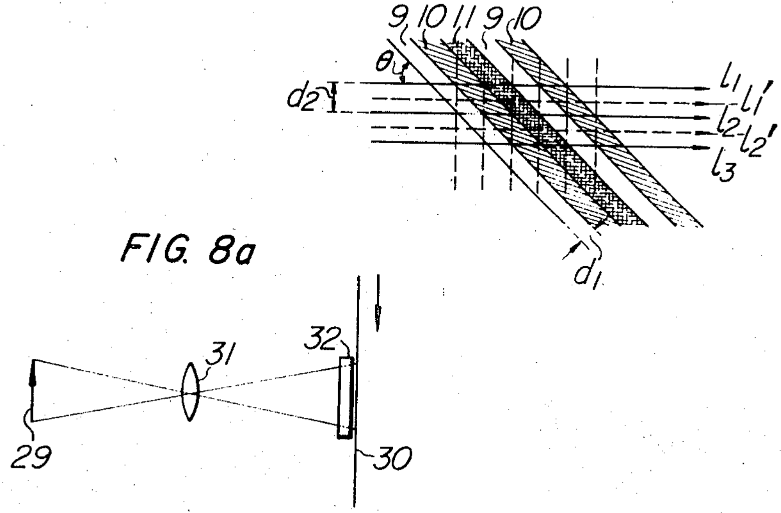
FIGS. 8*a* and 8*b* are schematic diagrams showing essential parts of another embodiment of this invention.

In the above-described embodiment, the operating principle is based on the correlation between adjacent horizontal scanning lines. However, this invention is not limited to that, but it may be based on the horizontal correlation if this correlation is sufficiently close for the intended purpose. Referring to FIG. 7, for example, if the output signal $S_{(t)}$ of the image pickup tube is delayed by T/3 and then subtracted from the undelayed signal $S_{(t)}$ per se, the resultant signal will have substantially the same waveform as the signal indicated by $S_{(t-h)} - S_{(t)}$ in FIG. 7 (though the two signals are different in the phasic position by T/3). Therefore, it will be clear that by this method too, R, G and B chrominance signals are obtained using the circuits shown in FIG. 6, provided that the delay time of the delay line 16 should be set at T/3 in this case, instead of one horizontal scanning period T in the previous case. Further, it will be noted that in this method relying on the horizontal correlation, it is unnecessary to adopt such a special filter element as shown in FIG. 4 or 5, and an ordinary striped filter as shown in FIG. 2 can be used. In that case, however, the width of the component strips of the striped filter must be made very small in order to obtain a high resolution corresponding to that attained by the method of the previous embodiments, since the horizontal correlation is generally inferior to the vertical correlation.

As is seen in the heretofore described embodiments, the G component of the image is continuously picked up. However, R and B components are sampled by frequency $f$ ($f=1/T$) and can be accurately reproduced only in a frequency range of $\frac{1}{2} f$. Therefore, in order to prevent overlap in the spectrum or crosstalk, it is desirable to provide measures so as to limit the signal bands of R and B components to $\frac{1}{2} f$ or less prior to the photoelectric conversion. To achieve the above purpose, for example, R and B components of the incident light from an object are separated from G component by dichroic mirror and are led to the image tube through a path which is different in the distance from the path of G component, so that R and B components produce blurred images on the image tube while the G component is distinctly focused on the same image face of the tube.

In the above embodiments, R, B and G signals are obtained by processing the output of an image pickup tube on which the image of an object is focused through the special color filter. In the hereunder described embodiment, the image is first recorded on a black- and-white film through the filter, and the three primary color signals are produced from the recorded image through substantially the same process as described above in connection with FIGS. 6 and 7.

Figure 8B:
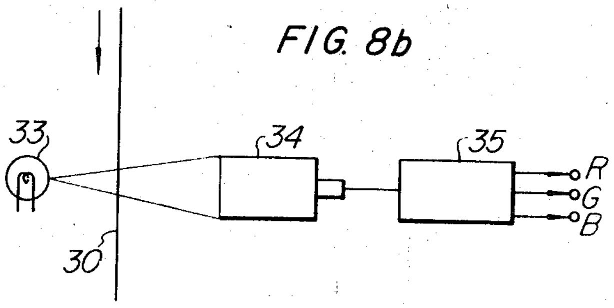

Referring to FIG. 8*a* which schematically shows a system used for recording the image of an object and the chrominance information thereof on a black- and-white film, an image of an object 29 is focused on a black- and-white sensitive film 30 by a camera lens 31. In front of the film 30 placed a special color filter 32 such as shown in FIG. 4 or 5. It will be understood that an ordinary stripe filter as shown in FIG. 2 can be used if the system is designed to operate on the basis of the horizontal correlation in the image. With such an arrangement as shown in FIG. 8*a*, the image can be recorded on the film 30 along with the chrominance information thereof. Referring to FIG. 8*b* which schematically shows an example of the system for reproducing the image and chrominance information recorded in the film 30, reference numeral 33 designates a light source, 34 an image pickup tube, and 35 a demodulating circuit. It will be understood that the light source 33 and the image pickup tube 34 can be substituted by a black- and-white flying-spot scanner. The information stored in the film 30 is projected on the image face of the image pickup tube 34 by the light from the light source 33. The black- and-white image on the image face is scanned by the electronic beam and the output of the image pickup tube 34 is demodulated in the demodulating circuit 35 in the same manner as described in connection with the previous embodiment. Thus, three primary chrominance signals are obtained. In FIGS. 8*a* and 8*b*, arrows indicate the direction of advance of the film 30.

As described above, according to this invention, the G component of three primary color signals is picked up without undergoing any modulation, and therefore can be accurately reproduced over the whole response range of the image pickup tube. Thus, the color image can be reproduced with a very high resolution.

I claim:

1. A chrominance signal generator comprising a filter having a color pattern of stripes or a lattice placed in front of a plane on which an image of an object is projected, said pattern being arranged in a manner such that when an image projected on said plane through said filter is scanned by a scanning means, a composite chrominance signal is obtained, said composite signal comprising three component signals representing three special color components respectively corresponding to the green component, either one of red and green or blue and green component, and red and blue and green component of said image, said three component signals occurring in an identical repetition period but in different phases to each other; means for obtaining said composite chrominance signal by scanning said image projected thereto; a delay circuit for delaying said composite circuit the inputs of which are said composite chrominance signal and the output of said delay circuit; means for extracting an index signal from the output of said operation circuit to thereby obtain a gating signal; means for obtaining the red component and blue component from said output of said operation circuit on the basis of said gating signal; and means for obtaining the green component from said red and blue components and said composite chrominance signal.

2. A chrominance signal generator as defined in claim 1, wherein said filter has a color pattern arranged in such a manner that said composite chrominance signal obtained in any horizontal scanning is different in the phasic position from the corresponding signal in the preceding scanning by one third of said identical repetition period, and said predetermined time delayed by said delay circuit corresponds to on horizontal scanning period.

3. A chrominance signal generator as defined in claim 1, wherein said plane on which an image of an object is projected is a plane of black- and-white sensitive film and said signal generator includes means for projecting an image recorded on said black- and-white sensitive film onto said means for obtaining said composite chrominance signal by scanning.

4. A black- and-white sensitive film for the chrominance signal generation, on which are recorded a black- and-white image of an object and a color information about the object, said image and color information being obtained by focusing the light from the object on the sensitive film through a special color filter having a striped or latticed pattern, said pattern being arranged in a manner such that, when the image focused on the film is scanned by a scanning means in a predetermined direction, a composite chrominance signal is obtained, said composite signal comprising three component signals representing three special color components respectively corresponding to the green component, either one of the red and green or blue and green component, and the red and blue and green component of said image, said three component signals occurring in an identical repetition period but in different phases to each other, and said composite signal being different in the phasic position from the corresponding signal in the preceding scanning by one third of said identical repetition period.

5. A chrominance signal generator as defined in claim 1, wherein said index signal extracted by said means for extracting an index signal is the red and blue component.

6. A chrominance signal generator as defined in claim 2, wherein said filter having a color pattern of stripe is placed in such that the direction of the stripes is inclined at a predetermined angle $\theta = \cos^{-1}(d_1/d_2)$ in relation to the direction of the electronic scanning, where $d_1$ is the width of each stripe and $d_2$ is the distance between scanning lines.

7. A chrominance signal generator comprising a filter having a color pattern of stripes placed in front of a plane on which an image of an object is projected, said pattern being arranged in a manner such that when an image projected on said plane through said optical filter is scanned horizontally with an electron beam, a composite chrominance signal is obtained, said composite signal comprising three component signals respectively corresponding to the green component, either one of the red and green or blue and green component, and the red and blue and green component, said three component signals occurring in an identical repetition period but in different phases to each other, and said composite signal being different in the phasic position from the corresponding signal in the preceding scanning by one third of said identical petition period;

means for obtaining said composite chrominance signal by scanning said image projected thereto;

a delay circuit for delaying said composite chrominance signal by one horizontal scanning period;

a subtractor circuit for obtaining the difference signal between said composite chrominance and the output of said delay circuit;

means for extracting the red and blue component as an index signal from the output of said subtractor circuit to thereby obtain a gating signal;

means for obtaining the red component and the blue component from said output of said subtractor circuit on the basis of said gating signal;

and means for obtaining the green component from a part of said red and blue components, said composite chrominance signal and said gate signal.

8. A generator according to claim 7, wherein said means for extracting the red component and the blue component from the output of said subtractor comprises a first gate circuit connected to the output of said subtractor, a second delay circuit connected to the output of said index signal extracting means, said first gate circuit being gated by said delay circuit and a first low-pass filter connected to the output of said first gate circuit to thereby provide said red component, and a second gate circuit connected to the output of said subtractor, and a third delay circuit connected to the output of said second delay circuit, said second gate circuit being gated by said third delay circuit and a second low-pass filter connected to the output of said second gate circuit to thereby provide said blue component.

9. A generator according to claim 8, wherein said means for extracting the red and blue component comprises an adder circuit connected to the output of said first and second low-pass filter.

10. A generator according to claim 9, wherein said means for obtaining the green component comprises a third gate circuit connected to the output of said adder circuit and being gated by the output of said index signal extracting means, a fourth gate circuit connected to the output of said first low-pass filter and being gated by the output of said third delay circuit and an additional adder circuit responsive to the output of said fourth gate circuit and said third gate circuit for adding the signals provided thereby, a frequency compensator connected to said additional adder circuit and an additional subtractor circuit for obtaining the difference between the output of said frequency compensator and said means for obtaining the composite chrominance signal, to thereby provide said green signal.

11. A method of recording an image and color information of an object, comprising the steps of:

providing a black- and-white sensitive film; and focusing light from said object onto said sensitive film through a filter having a striped or latticed pattern means, said pattern means being arranged and responsive to a scanning of the image formed on the film on a predetermined direction, for producing a composite chrominance signal, said composite signal comprising three component signals representing three particular color components, respectively, corresponding to the green component, one of the red plus green or blue plus green components, and the red plus green plus blue component of the image, said three component signals occurring in an identical repetition period but in different phases to each other, and said composite signal being different in the phasic position from the corresponding signal in the preceding scanning by one-third of said identical repetition.